(12) United States Patent
Zhang et al.

(10) Patent No.: US 9,049,366 B2
(45) Date of Patent: Jun. 2, 2015

(54) APPARATUS AND METHOD FOR DRIVING A VOICE COIL MOTOR OF A CAMERA LENS

(71) Applicants: Hong Zhang, Shanghai (CN); Qing Yang, Shanghai (CN); Hong Ru Xu, Shanghai (CN); Cheng Zhang, Shanghai (CN)

(72) Inventors: Hong Zhang, Shanghai (CN); Qing Yang, Shanghai (CN); Hong Ru Xu, Shanghai (CN); Cheng Zhang, Shanghai (CN)

(73) Assignee: GIANTEC SEMICONDUCTOR LTD. INC., Shanghai (CN)

( * ) Notice: Subject to any disclaimer, the term of this patent is extended or adjusted under 35 U.S.C. 154(b) by 0 days.

(21) Appl. No.: 14/063,840

(22) Filed: Oct. 25, 2013

(65) Prior Publication Data
US 2015/0116579 A1 Apr. 30, 2015

(51) Int. Cl.
*H04N 5/225* (2006.01)
*G03B 15/03* (2006.01)
*G02B 7/02* (2006.01)
*H04N 5/232* (2006.01)

(52) U.S. Cl.
CPC ................ *H04N 5/23212* (2013.01)

(58) Field of Classification Search
CPC ....... H04N 5/232; H04N 5/225; G03B 15/03; G02B 7/02
USPC ........... 348/345–360; 396/135; 359/696, 694, 359/824; 327/306
See application file for complete search history.

(56) References Cited

U.S. PATENT DOCUMENTS

| | | | | |
|---|---|---|---|---|
| 2009/0058328 A1* | 3/2009 | Ishii et al. | ...................... | 318/135 |
| 2011/0156763 A1* | 6/2011 | Gao et al. | ...................... | 327/108 |
| 2012/0230666 A1* | 9/2012 | Li et al. | ...................... | 396/135 |
| 2012/0257099 A1* | 10/2012 | Tsai | ............................... | 348/349 |
| 2013/0147968 A1* | 6/2013 | Lin | ............................... | 348/184 |
| 2013/0169857 A1* | 7/2013 | Christo et al. | ................ | 348/349 |

* cited by examiner

*Primary Examiner* — Lin Ye
*Assistant Examiner* — Marly Camargo
(74) *Attorney, Agent, or Firm* — Yuan Qing Jiang

(57) ABSTRACT

The present invention relates to a device and method for driving an under damped voice coil motor (VCM) actuator of a camera lens. In one embodiment, the device for driving an under damped VCM actuator comprises a first generator operable to read a first manufacture data from an image signal processor (ISP) and to generate a half natural period, $\frac{1}{2} T_d$, of the VCM actuator by selecting a value approximate to the first data in a first table of the device, a second generator operable to read a second manufacture data from the ISP and to generate the maximum overshoot, K, of the VCM actuator by selecting a value approximate to the second data in a second table of the device, an input shaping signal generator operable to read an input signal corresponding to a desired camera lens moving distance from the ISP and to generate a shaping signal according to the value of the half natural period and the maximum overshoot. The input shaping signal may be produced from second order, third order and fourth order input shaping function. The present invention also provides a simple implementation of a driver configuration to achieve a fast camera lens focus speed, yet robust to tolerate actual system deviation from a manufacture design.

10 Claims, 14 Drawing Sheets

Prior Art

APPARATUS AND METHOD FOR DRIVING A VOICE COIL MOTOR OF A CAMERA LENS

FIELD OF INVENTION

The present invention relates generally to the field of semiconductor integrated circuit for a motor control system, and more particularly to a device and method for driving an under damped voice coil of a camera lens. This application claims priority to Chinese patent application No. CN 201310280360.7, filed on Jul. 4, 2013, and all the benefits accruing therefrom under 35 U.S.C. §119, the contents of which in its entirety are herein incorporated by reference.

BACKGROUND OF INVENTION

Voice coil motor (VCM) is widely used in the electronic products. In recent years it is a popular solution for driving and focusing the lenses of cameras of smart phones and tablet computers. By taking signals from an image signal processor (ISP), a driver IC produces the corresponding current output to drive a voice coil actuator, thus changes the lens position to reach the focus point. Since voice coil actuator changes lens position linearly for a short distance, it is widely used for precise tracking or focusing. VCM actuator can be modeled as a second order under damped system. As the size of VCM is getting smaller and the weight of VCM is getting lighter, the system damping ratio of the VCM actuator becomes smaller. When a driving current applied to the coil of VCM, the Lorentz force generated by electromagnetic force of the coil in a magnetic field from a permanent magnet moves lens linearly. However, the VCM actuator as a second order under damped system will cause mechanical oscillation. The lens will oscillate around the final focus position for a while, leading to a long focus time for the lens. The smaller the damping ratio is, the longer the time the lens settles to its final position.

In order to develop cameras with fast focus time, several methods in the art of driving VCM actuator have been suggested and practiced to eliminate the oscillation or decrease the oscillation magnitude. For example, one can increase the system damping ratio to limit the oscillation, so as to achieve fast focus. However, increasing the system damping ratio will increase the power consumption of the driving system, decrease the battery time, and therefore it is not practical and is not adopted in a camera of a mobile system.

US Patent Application No. 20110156763 discloses a two-step driving method to achieve a fast focusing speed. This method relies on a precise knowledge about the natural frequency of each individual VCM in order to provide the amplitudes for the two step signals to form a fast system response. In practice, every coil may have a slightly different natural frequency from the targeted manufacturer's design value, deviating from an actual natural frequency may lead to residual oscillation after the lens reaches the desired position, and therefore increase actual focusing time. Furthermore, in order to implement this method without a complicated driver device design, an assumption that the damping coefficient is zero has to be made. This assumption may further depart away from an actual VCM behavior, resulting in additional factors causing the residual oscillation.

In view of the above problems of controlling mechanical oscillations in an under damped second order VCM system, there are needs to improve the settling speed of a VCM, minimize the residual oscillation, and simplify the driver device design and configuration.

BRIEF DESCRIPTION OF THE DRAWINGS

A more complete appreciation of the invention and many of the attendant advantages thereof will be readily obtained and understood by referring to the following detailed description and the accompanying drawings in which like reference numerals denote like elements as between the various drawings.

DETAILED DESCRIPTION OF THE INVENTION

Before proceeding with the detailed description, it is to be appreciated that the present teaching is by way of example, not by limitation. Thus, although the VCM driving device and various implementations described herein are for the convenience of explanation shown and described with respect to exemplary embodiments of drivers and specifically shaping signals (also referred as "shaping functions") and their implementations, it will be appreciated that the principles herein may be applied equally in other types of under damped systems. Alternate embodiments may be devised without departing from the scope of the invention. Additionally, well-known elements of the invention will not be described in detail or will be omitted so as not to obscure the relevant details of the invention.

Figure 1:
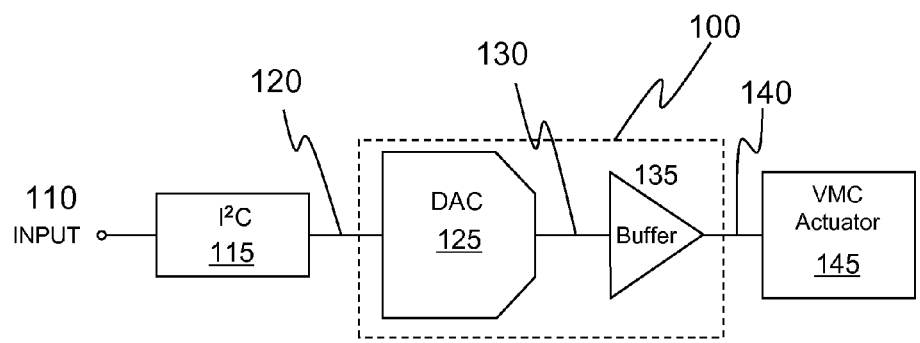
FIG. 1 is a simplified block diagram of a prior art VCM actuator driver system.

FIG. 1 is a simplified block diagram of a commonly used VCM lens driver system. The lens position of a camera is driven by VCM actuator 145; the lens moving distance is proportional to the output current of the lens driver integrated circuit (IC) 100. Image signal processor (ISP) sends an input signal 110 through Inter-Integrated Circuit (I²C) interface 115 to the driver IC 100. After receiving the output current command at node 120, the driver IC converts the digital command to analog value through a digital to analog converter (DAC) 125, the analog signal is send to buffer 135 at node 130, and the buffer produces the required output current to the VCM actuator 145 at node 140. The VCM actuator uses Lorentz force to move the lens to a desired position, which completes a driven process. The VCM actuator can be described as an under damped second order system. The typical natural frequency is in the range of few tens Hertz to a few hundred Hertz. The damping ratio is ranged from 0.01 to 0.1. Without losing generality, unless otherwise indicated, we will take system natural frequency $f_d = \omega_d/2\pi = 110$ Hz, and damping ratio $\zeta = 0.02$ for illustration and simulation.

Figure 2:
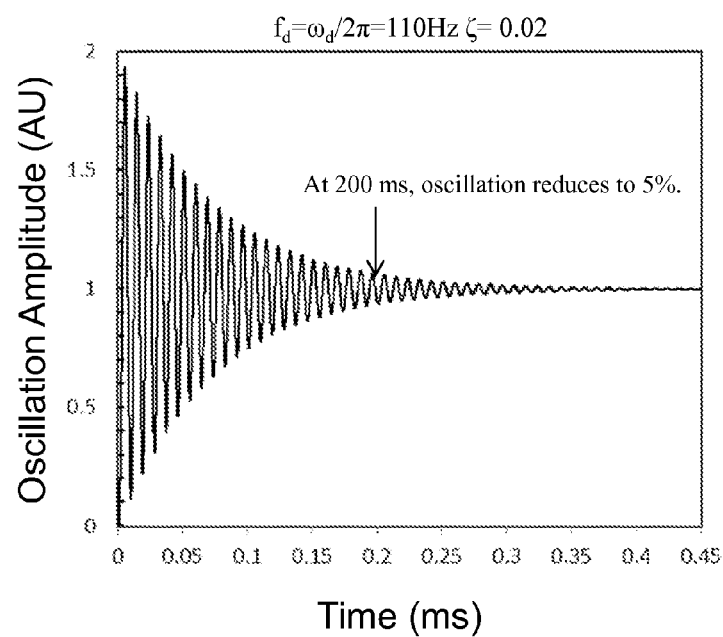
FIG. 2 is a graph of transient response of a second order under damped system to an input step signal.

FIG. 2 shows the step response of the VCM actuator in the system shown in FIG. 1. Assuming that a lens is initially at the position $x_0=0$, at time $t_0=0$, the system needs to push the lens to position $x_1=1$. After 200 ms (millisecond) the magnitude of the actuator oscillation decreased within 5% of the desired position. Thus the camera system required focus time is longer than 200 ms. Such a long focus time is not acceptable in many applications.

Figure 3A:
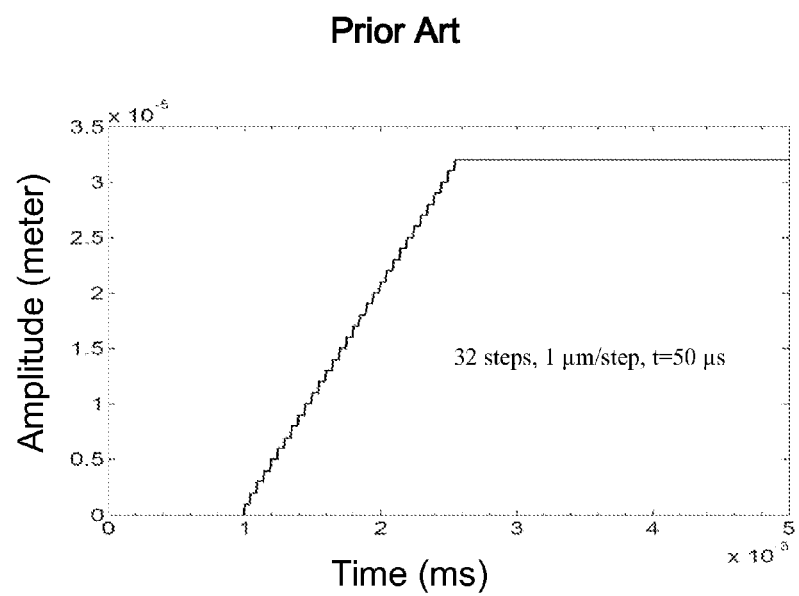
FIG. 3A is a graph of multiple step input signal with 32 steps.
Figure 3B:
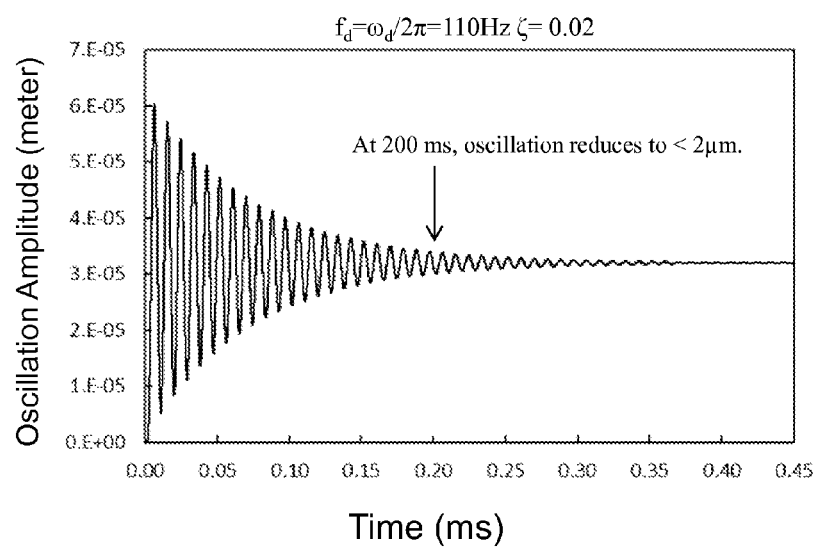
FIG. 3B is a graph of transient response of a second order under damped system to the input step signal given in FIG. 3A.

A method to reduce the focus time is to divide an input signal to a multiple step signal in order to decrease the oscillation magnitude. FIG. 3A shows the input signal with 32 equal steps. The time interval of each step is 50 µs, and the step size is 1 µm. FIG. 3B shows the second order damped system response to the input step signal of FIG. 3A. As it can be seen that it takes 200 ms for the system to settle the lens within 2 µm of the desired focus position. Therefore, the system response time is still too long for the multiple step input signal. Normally the camera module with a VCM actuator has a resolution about 1 µm~2 µm. Thus this camera system needs more than 200 ms to focus using the given input step signal. In order to achieve the fast focus we need to find a method to eliminate or greatly reduce the oscillation of under damped system.

Figure 4:
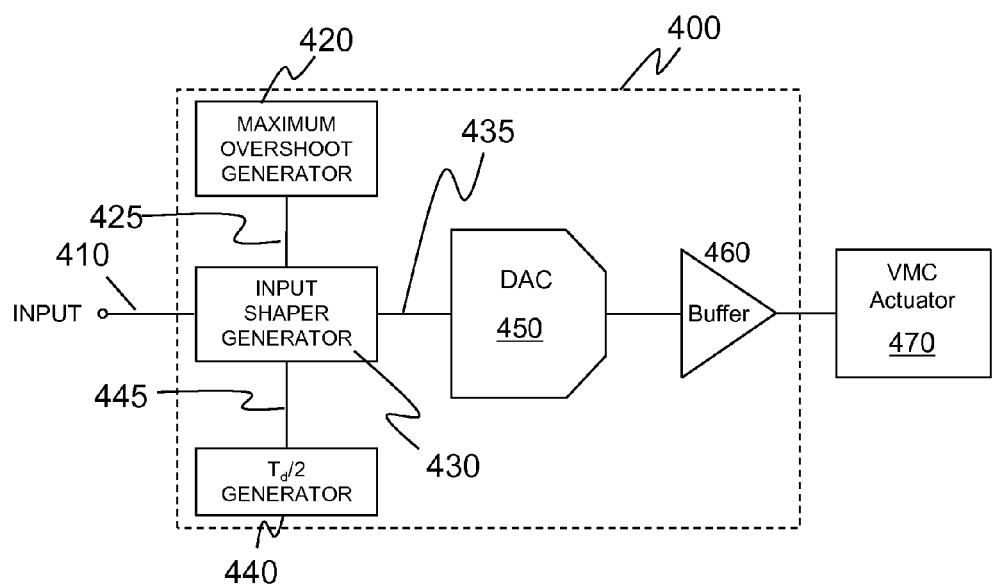
FIG. 4 is a block diagram illustrating a driver of an under damped VCM actuator of a camera lens in accordance with one embodiment of the present invention.

FIG. 4 is a block diagram illustrating a driver for an under damped VCM actuator in accordance with one embodiment of the present invention. Herein the term "driver" is referring to a driving device for the VCM actuator to drive the camera lens, and the driver is also referred as the "driver IC". As shown in FIG. 4, the driver 400 comprises a first generator 440 ("$T_d/2$ Generator") which is operable to read a first manufacture data from an image signal processor (ISP) and to generate a half natural period, ½ $T_d$ of the VCM actuator, by selecting a value approximate to the first manufacture data in a first table of the driver. The driver also comprises a second generator 420 ("Maximum Overshoot Generator") which is operable to read a second manufacture data from the ISP and to generate the maximum overshoot, K of the VCM actuator, by selecting a value approximate to the second manufacture data in a second table of the driver.

Still referring to FIG. 4, an input shaping signal generator 430 of the diver is configured to be operable to read an input signal 410 corresponding to a desired camera lens moving distance from the ISP and to generate a shaping signal at node 435 according to the value of the half natural period received at node 445 and the maximum overshoot value received at node 425. The driver further comprise a digital to analog converter 450 (DAC), and a buffer amplifier 460, wherein the digital to analog converter receives the digital shaping signal at node 435 and converts the signal to an analog signal, and the buffer amplifier converts the analog shaping signal to a proper current required for the voice coil actuator 470 to drive the camera lens to the desired distance.

FIG. 5 to FIG. 13 illustrate various exemplary embodiments of the present invention. The system (e.g. a camera lens or camera lens module) can be described as an under damped second order system with the following transfer function:

$$G(s) = \frac{\omega_n^2}{s^2 + 2\zeta\omega_n s + \omega_n^2}; \qquad (1)$$

Wherein $\omega_n$ is the circular natural frequency of the system, $\zeta$ is the damping ratio of the system, s is s-domain variable (s is the variable obtained from the Laplace transformation of the time variable t); at $t=t_0$ the system time response to an impulse signal with magnitude $A_0$ is:

$$x(t) = A_0 \frac{\omega_n}{\sqrt{1-\zeta^2}} e^{-\zeta\omega_n(t-t_0)} \sin(\omega_d(t-t_0)); \qquad (2)$$

where $\omega_d$ is the damped circular natural frequency of the system, $$\omega_d = \omega_n\sqrt{1-\zeta^2} \qquad (3);$$

From superposition principle, one can get the time response of the system to n series impulse signals as following:

$$x(t) = \sum_{i=1}^{n}\left[\frac{A_i\omega_n}{\sqrt{1-\zeta^2}}e^{-\zeta\omega_n(t-t_i)}\right]\sin(\omega_d(t-t_i)); \qquad (4)$$

From equation (4) one can get the time response of the system to the last impulse signal at $t=t_n$:

$$x(t_n) = \frac{\omega_n}{\sqrt{1-\zeta^2}}e^{-\zeta\omega_n t_n}\sqrt{C^2+S^2}\sin(\omega_d t_n + \psi); \qquad (5)$$

Wherein phase $\psi$ is the function of circular natural frequency and $\zeta$ is the damping ratio of the system; and $$C = \Sigma_{i=1}^{n} A_i \zeta^{\omega_n t_i} \cos(\omega_d t_i) \qquad (6);$$

$$S = \Sigma_{i=1}^{n} A_i \zeta^{\omega_n t_i} \sin(\omega_d t_i) \qquad (7);$$

According to equation (5), to a unity impulse signal at $t=0$ ($A_1=1, A_i=0$, for $i\neq 0$), the residue magnitude of the oscillation is:

$$A_{unit} = \frac{\omega_n}{\sqrt{1-\zeta^2}}; \qquad (8)$$

From equation (5) and equation (8) one can get the percentage vibration equation:

$$V(\omega_n, \zeta) = e^{-\zeta \omega_n t_n} \sqrt{C^2 + S^2} \qquad (9)$$

At $t=t_n$, if the phases of all n impulse signals are canceled, then the system oscillation will vanish, e.g.

$$V(\omega_n, \zeta) = 0 \qquad (10);$$

Combined with the normalization condition:

$$\Sigma_{i=1}^n A_i = 1 \qquad (11);$$

One can obtain the second order input shaping equation:

$$\begin{bmatrix} A_i \\ t_i \end{bmatrix} = \begin{bmatrix} \dfrac{1}{(1+K)} & \dfrac{K}{(1+K)} \\ 0 & \dfrac{T_d}{2} \end{bmatrix}; \qquad (12)$$

Wherein $T_d = 2\pi\omega_d$ and K is the first peak value of the overshoot (the maximum overshoot of the system), $$K = e^{-\pi\zeta/\sqrt{1-\zeta^2}} \qquad (13);$$

Figure 5:
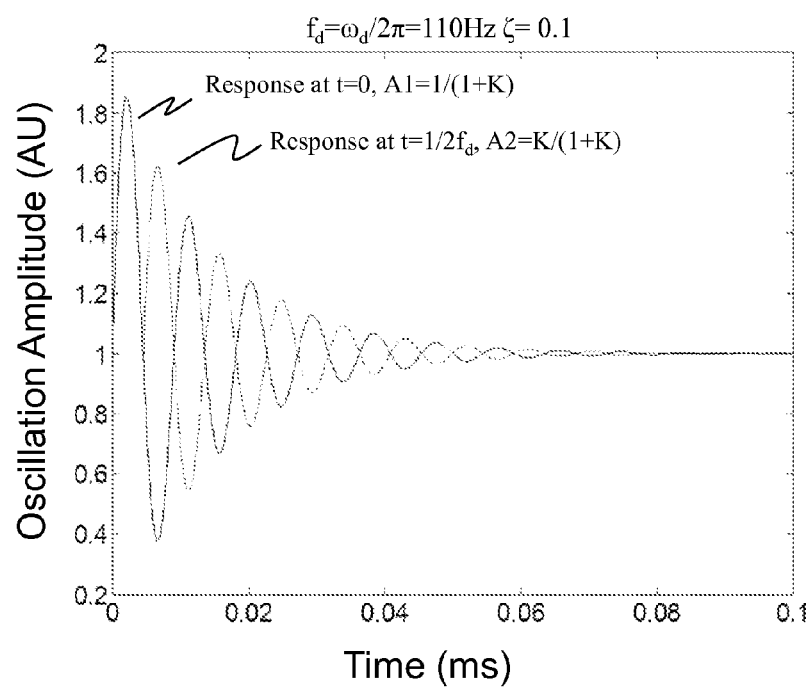
FIG. 5 illustrates the impulse response of a second order system to a two series impulse signal given in FIG. 6A.

FIG. 5 is a graph of time response of second order lightly damped system to second order impulse signal. One can see that the two impulse signals will produce two outputs with the same magnitude but opposite phase after half of the natural cycle, that results the cancellation of the system oscillation.

By adding another constraint equation:

$$\dfrac{d}{d\omega_n} V(\omega_n, \zeta) = 0; \qquad (14)$$

One can get the third order input shaping equation:

$$\begin{bmatrix} A_i \\ t_i \end{bmatrix} = \begin{bmatrix} \dfrac{1}{(1+K)^2} & \dfrac{2K}{(1+K)^2} & \dfrac{K^2}{(1+K)^2} \\ 0 & \dfrac{T_d}{2} & T_d \end{bmatrix}; \qquad (15)$$

By introducing second differentiation of vibration equation equal to zero:

$$\dfrac{d^2}{d^2\omega_n} V(\omega_n, \zeta) = 0); \qquad$$

The fourth order input shaping equation can be obtained as:

$$\begin{bmatrix} A_i \\ t_i \end{bmatrix} = \begin{bmatrix} \dfrac{1}{(1+K)^3} & \dfrac{3K}{(1+K)^3} & \dfrac{3K^2}{(1+K)^3} & \dfrac{K^3}{(1+K)^3} \\ 0 & \dfrac{T_d}{2} & T_d & \dfrac{3T_d}{2} \end{bmatrix}. \qquad (16)$$

Similarly we can construct an $N^{th}$ order input shaping equation; it includes N impulse signals, the magnitude of each impulse signal is corresponding to the expansion coefficients of the equation $(1+K)^{(N-1)}$:

$$\begin{bmatrix} A_i \\ t_i \end{bmatrix} = \begin{bmatrix} \dfrac{1}{(1+K)^{N-1}} & \cdots & a_i \dfrac{K^{i-1}}{(1+K)^{N-1}} & \cdots & \dfrac{K^{N-1}}{(1+K)^{N-1}} \\ 0 & \cdots & (i-1)\dfrac{T_d}{2} & \cdots & (N-1)\dfrac{T_d}{2} \end{bmatrix}. \qquad (16a)$$

Wherein $a_i$ is a coefficient and can be found from the $i^{th}$ row of Pascal's triangle. The time interval of each impulse signal is a half of the natural cycle time. When the order of the input shaping increases by one, the system settling time will increase half natural cycle time.

Figure 6A:
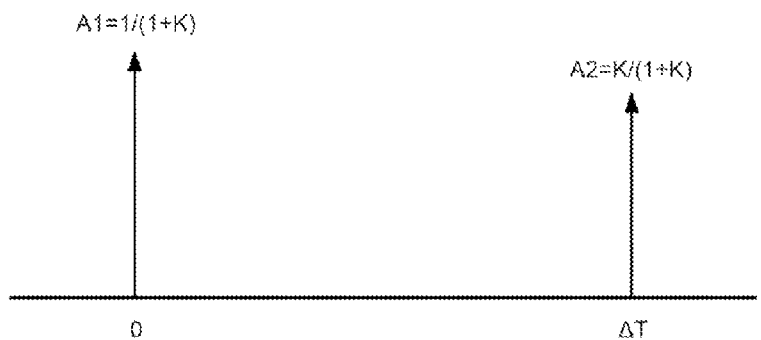
FIG. 6A is a second order impulse signal used for input shaping, in accordance with one embodiment of the present invention.
Figure 6B:
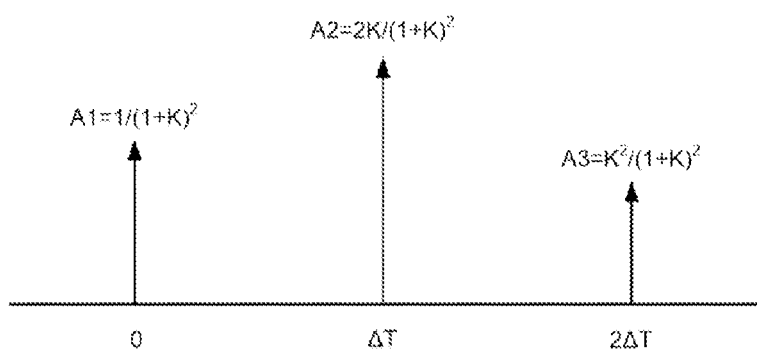
FIG. 6B is a third order impulse signal used for input shaping, in accordance with one embodiment of the present invention.
Figure 6C:
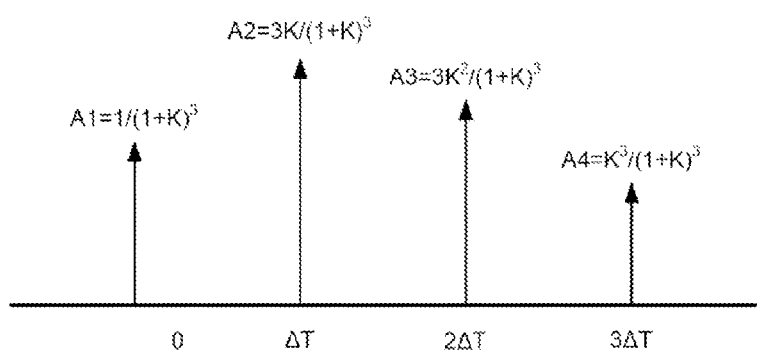
FIG. 6C is a fourth order impulse signal used for input shaping, in accordance with one embodiment of the present invention.

Second order, third order and fourth order impulse signals are illustrated in FIG. 6A to 6C. For a given input step signal, the input shaping signals can be constructed from the convolution of the input signal with the impulse signals at nodes 425 and 445 of FIG. 4, generated from Maximum Overshoot Generator 420 and $T_d/2$ Generator 440 respectively.

Figure 7A:
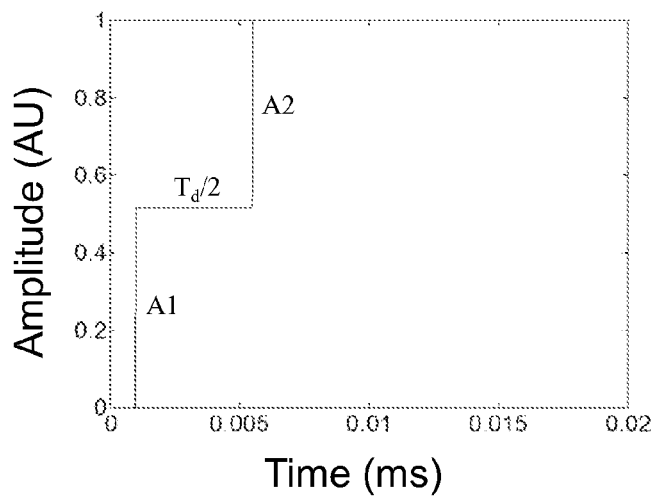
FIG. 7A is a second order input shaping signal.
Figure 7B:
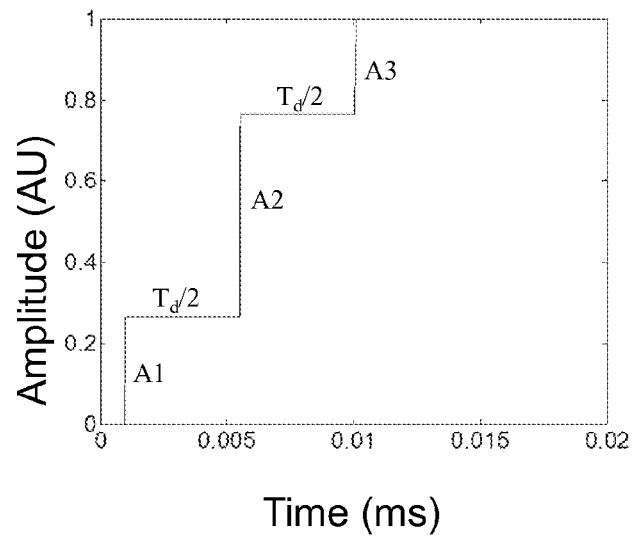
FIG. 7B is a third order input shaping signal.
Figure 7C:
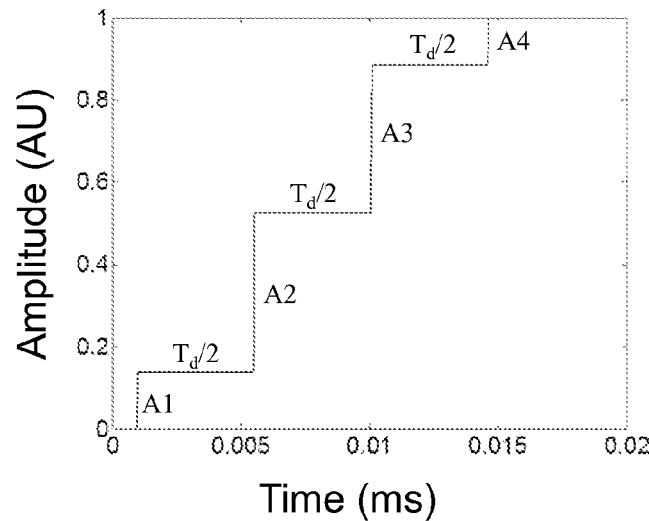
FIG. 7C is a fourth order input shaping signal.

FIG. 7A to 7C shows the second order, third order and fourth order shaping signals corresponding to functions (12), (15), and (16). These shaping signals can be used in the VCM actuator control. The oscillation caused by the lightly damping of the system is cancelled by the shaping signals.

Figure 8:
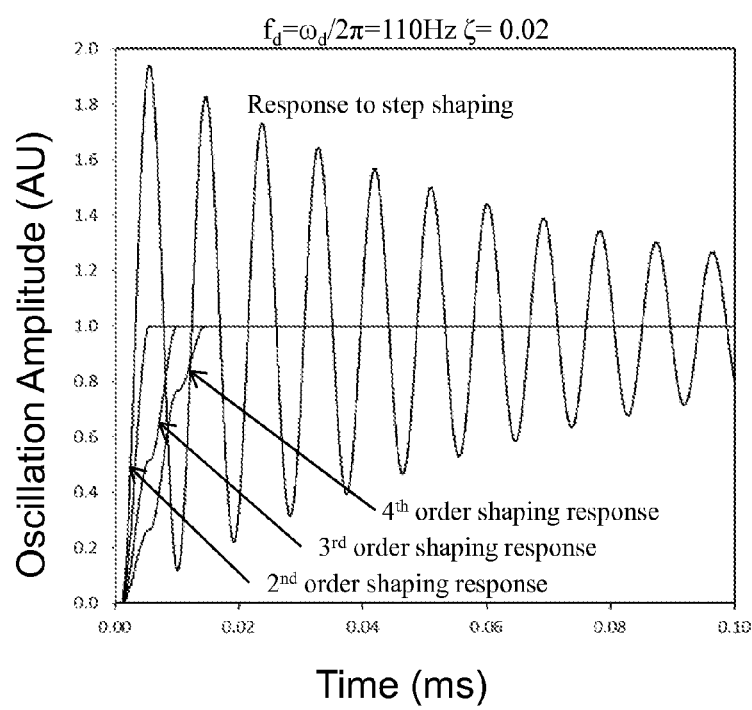
FIG. 8 is a graph of transient responses of a second order under damped system to different orders of input shaping signals.

FIG. 8 shows the graph of the VCM actuator responses to the second order input shaping signal (shown in FIG. 6A), the third order input shaping signal (shown in FIG. 6B) and the fourth order input shaping signal (shown in FIG. 6C). For comparison, FIG. 8 also shows the VCM actuator responses to the step input signal (shown in FIG. 3A). From the graph one can see that, the input shaping signals (FIG. 6A to 6C) cancel the output oscillation. The system will settle after $T_d/2$, $T_d$, and $3T_d/2$ using second order, third order, and forth order input shaping signal respectively. Wherein $T_d$ is the VCM actuator's natural period time, $T_d = 2\pi/\omega_d$.

Higher order input shaping signal will produce longer settling time delay on the half natural cycle time base. However, higher order input shaping signals are more robust, it greatly decreases the sensitivity of the input shaping signal to the natural frequency and damping ratio. Herein the sensitivity is referring to the amount of residual oscillation at the targeted settling time. Considering the measurement and implementation complicity, the sensitivity of input shaping signals to natural frequency and damping ratio should be investigated.

Figure 9:
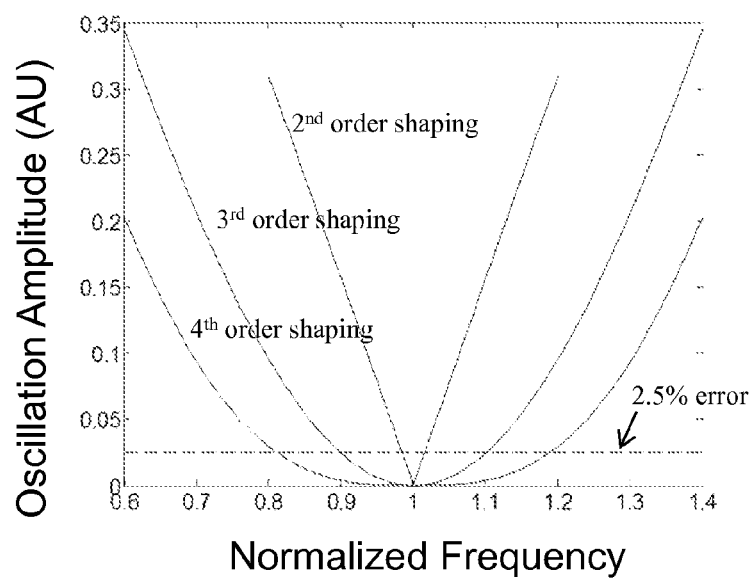
FIG. 9 is a graph of sensitivity curves of different input shaping signals as functions of system natural frequency.

FIG. 9 is a graph of the sensitivities for second order, third order and forth order input shaping signals to the natural frequency. If a margin of error between the model frequency and the actual natural frequency is larger than 1.5%; the residual oscillation magnitude of the system with second order input shaping signal will exceed 2.5%. For system using third order input shaping signal, this acceptable margin of frequency error can be ±10%, and further relax to ±19% for the system using fourth order input shaping signal.

Figure 10:
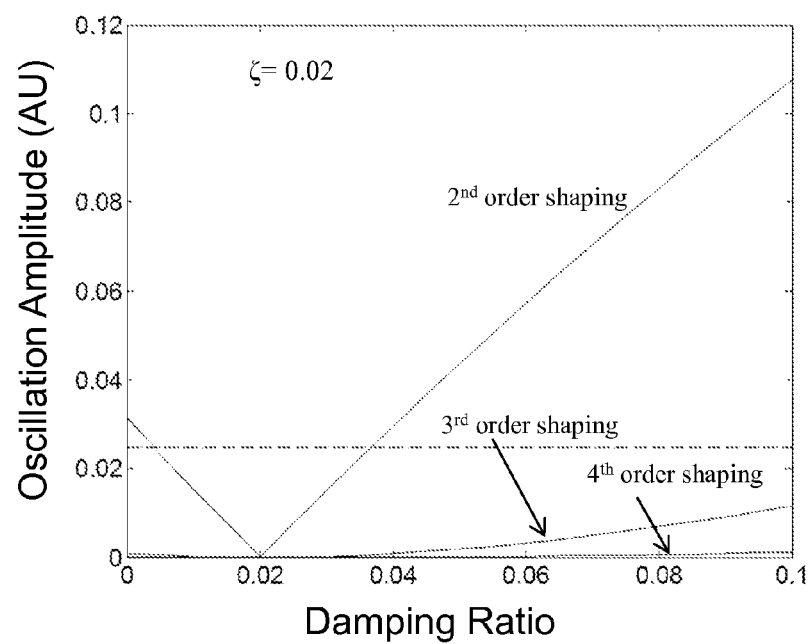
FIG. 10 is a graph of sensitivity curves of different input shaping signals as functions of natural system damping ratio.

FIG. 10 is a graph of the sensitivities to the damping ratio for the system with second order, third order, and fourth order input shaping signals. Assuming the modeled damping ratio of the system is 0.02, when actual damping ratio is larger than 0.035, the second order input shaping system will produce more than 2.5% oscillation magnitude. For modeled damping ratio less than 0.1 the error percentages of third order and fourth order systems are very small. This indicates that the third order and fourth order input signal shaping systems are much less sensitive to the margin of errors of the damping ratio. Therefore the systems using higher order input shaping signals will relax the requirements of system natural frequency and damping ratio (or overshoot value) measurement, tolerate the margin of errors, and simplify the system design complexity.

In order to implement the input shaping method in this disclosure, the driver for VCM actuator needs to receive the system damped natural frequency. Normally VCM manufacturers measure the damped natural frequency (or period time), which is then stored in the ISP. After receiving the damped natural frequency from ISP, the first generator 440 (referring to FIG. 4) in driver 400 uses a first table, which can be a look up table in the driver 400, to produce the internal clock frequency accordingly. This clock frequency is used to produce the input shaping signals. The higher the input shaping signal order is, the simpler the look up table will be, since the system with high order input shaping signal is less sensitive to the natural frequency. For the second order input shaping signal system, the look up tables in the driver need to guarantee 1.5% accuracy in order to keep the output oscillation magnitude less than 2.5%. This requirement not only increases the look up table size, but also increases the design complexity of the internal clock. At the same time, it still requires relatively accurate measurement on the system natural frequency. Higher order input shaping signal systems will greatly reduce the size of the internal look up table and circuit design complexities, and relax the measurement accuracy of the natural frequency.

The magnitude of the input shaping signal is a function of the maximum overshoot value K. When applied a unity impulse to the system, the K value can be obtained by measuring the first overshoot peak value. Similar to the natural frequency sensitivity case, the system having a high order input shaping signal is much less sensitive to the measurement accuracy of the damping ratio comparing to the system having a second order input shaping signal. Therefore the high order input shaping signal systems relax the requirement on the system damping ratio (or peak overshoot value) measurement, greatly reduced the internal look up table and design complexities.

Referring back to FIG. 4, the driver 400 implements the input shaping signal to drive VCM actuator. Assuming the lens of the camera initially is in position $x_0$, the desired final position is at $x_1$, and the position change is $\Delta x$. Through I²C series interface (omitted in FIG. 4), the maximum overshoot value generator 420 in driver 400 receives K value from the ISP, and finds and locks the corresponding K value for internal circuits using the internal look up table, which is the second table in the driver system. The half natural period time generator 440 ($T_d/2$ Generator) in driver 400 receives the system natural period time, and finds and locks the corresponding $T_d/2$ value for internal circuits using the internal look up table, referred as the first table in the driver. The input shaping signal generator 430 in driver receives position change input signal, maximum overshoot value and half natural cycle time through nodes 410, 425 and 445 respectively, generates the system selected input shaping signals (as shown in FIG. 7A to 7C). For a second order input shaping signal system, the input shaping signal generator 430 generates a step signal with magnitude $$A_1 = \frac{\Delta x}{(1+K)};$$

after keeping the signal magnitude at A1 for $T_d/2$, it generates a step signal with magnitude $\Delta x$. Input signal shaping generator sends this shaped input signal to DAC 450 through node 435. DAC 450 then converts the signal to an analog shaping signal and sends the analog signal to the buffer amplifier 460. The buffer amplifier 460 converts the analog shaping signal to a proper current required for the voice coil actuator to drive the camera lens from initial position $x_0$ to the given final position $x_1$, and complete the desired lens movement. For the third order input shaping signal system, the magnitudes of input shaping signals are $$A_1 = \frac{\Delta x}{(1+K)^2}, A_2 = \frac{\Delta x * 2K}{(1+K)^2},$$

and A3=$\Delta x$. For fourth order input shaping system, the magnitudes of the input shaping signals are $$A_1 = \frac{\Delta x}{(1+K)^3}, A_2 = \frac{\Delta x * 3K}{(1+K)^3}, A_3 = \frac{\Delta x * 3K^2}{(1+K)^3} \text{ and } A4 = \Delta x.$$

The system using input shaping signals will eliminate or greatly reduce the output oscillation. The output settles at the $T_d/2$, $T_d$, and $3T_d/2$ for second, third and fourth order input shaping signal systems respectively. The natural period time $T_d$ of VCM actuator in a camera is in the range of few milliseconds seconds to tens of milliseconds. One can appreciate that the focus time is reduced from few hundreds of milliseconds with direct step signal to a few milliseconds or few tens of milliseconds with input shaping signals.

Since a high order input shaping signal system is less sensitive to the natural frequency and the damping ratio, the driver IC operated under a high order input shaping signal works well under default natural period times and a maximum overshoot value for most VCM modules. High order input shaping methods relax the requirement on the natural frequency and damping ratio measurements, reduce the complexity of the internal loop up tables and circuit design. The tradeoff is that when the order of the input shaping signal increases by one order, the output settling time of the system delays half natural period time.

Figure 11:
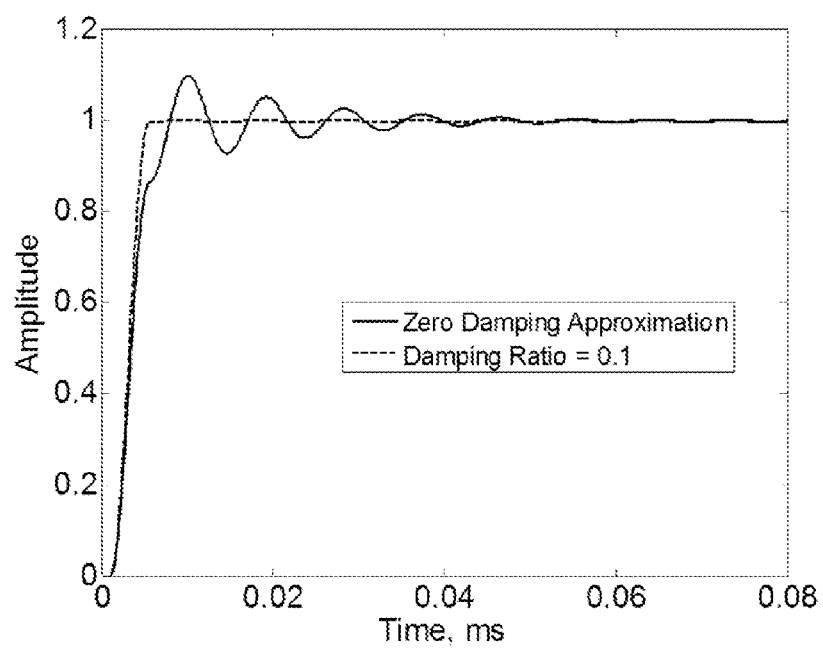
FIG. 11 is a graph of transient responses of a second order input shaping system under zero damping approximation method and the method of present invention.

The input shaping methods described by equations (12), (15) and (16) involve relatively complicated computation or more complex look up tables. One way to simplify the circuit implementation is to assume the damping ratio is zero, $\zeta = 0$, and therefore K=1, according to Eq (13). The shaping functions of (12), (15), and (16) are much simplified by assuming K=1 and they are not dependent of the damping ratio of the VCM actuator. However, this assumption leads to more residual oscillation. FIG. 11 shows a comparison of oscillation between a system operated under a second order input shaping system of $\zeta = 0.1$ using zero damping approximation ($\zeta = 0$) and an actual damping ratio of $\zeta = 0.1$. It is shown that the system under zeroing damping approximation takes more than 50 ms longer to settle than that of the system using the actual damping ratio.

In accordance with one embodiment of the present invention, the complexity of the circuit implementation of the input shaping equations can be reduced by the following method and device configuration without the assumption of zero damping ($\zeta = 0$).

In general the damping ratio of the VCM system is very small (in the range of 0.01 to 0.1), one can make first order approximation to equations (12), (15) and (16). Let M=1-K. According to equation (13), if $\zeta \ll 1$, K is close to 1 and, thus M≅0. Making a first order approximation one can obtain the second order input shaping equation as following:

$$\begin{bmatrix} A_i \\ t_i \end{bmatrix} = \begin{bmatrix} 0.5 + \dfrac{M}{4} & 0.5 - \dfrac{M}{4} \\ 0 & \dfrac{T_d}{2} \end{bmatrix}; \quad (17)$$

The third order input shaping equation is:

$$\begin{bmatrix} A_i \\ t_i \end{bmatrix} = \begin{bmatrix} \dfrac{1}{4}(1+M) & \dfrac{1}{2} & \dfrac{1}{4}(1-M) \\ 0 & \dfrac{T_d}{2} & T_d \end{bmatrix}; \quad (18)$$

The fourth order input shaping equation is:

$$\begin{bmatrix} A_i \\ t_i \end{bmatrix} = \begin{bmatrix} \dfrac{1}{8}\left(1+\dfrac{3M}{2}\right) & \dfrac{3}{8}\left(1+\dfrac{M}{2}\right) & \dfrac{3}{8}\left(1-\dfrac{M}{2}\right) & \dfrac{1}{8}\left(1-\dfrac{3M}{2}\right) \\ 0 & \dfrac{T_d}{2} & T_d & \dfrac{3T_d}{2} \end{bmatrix}; \quad (19)$$

Equations (17), (18) and (19) form simplified second order, third order and fourth order input shaping signal methods, respectively. Although these shaping functions are made under the assumption that $\zeta$ is very small, they still depend on the damping ratio $\zeta$ of the VCM actuator.

Figure 12:
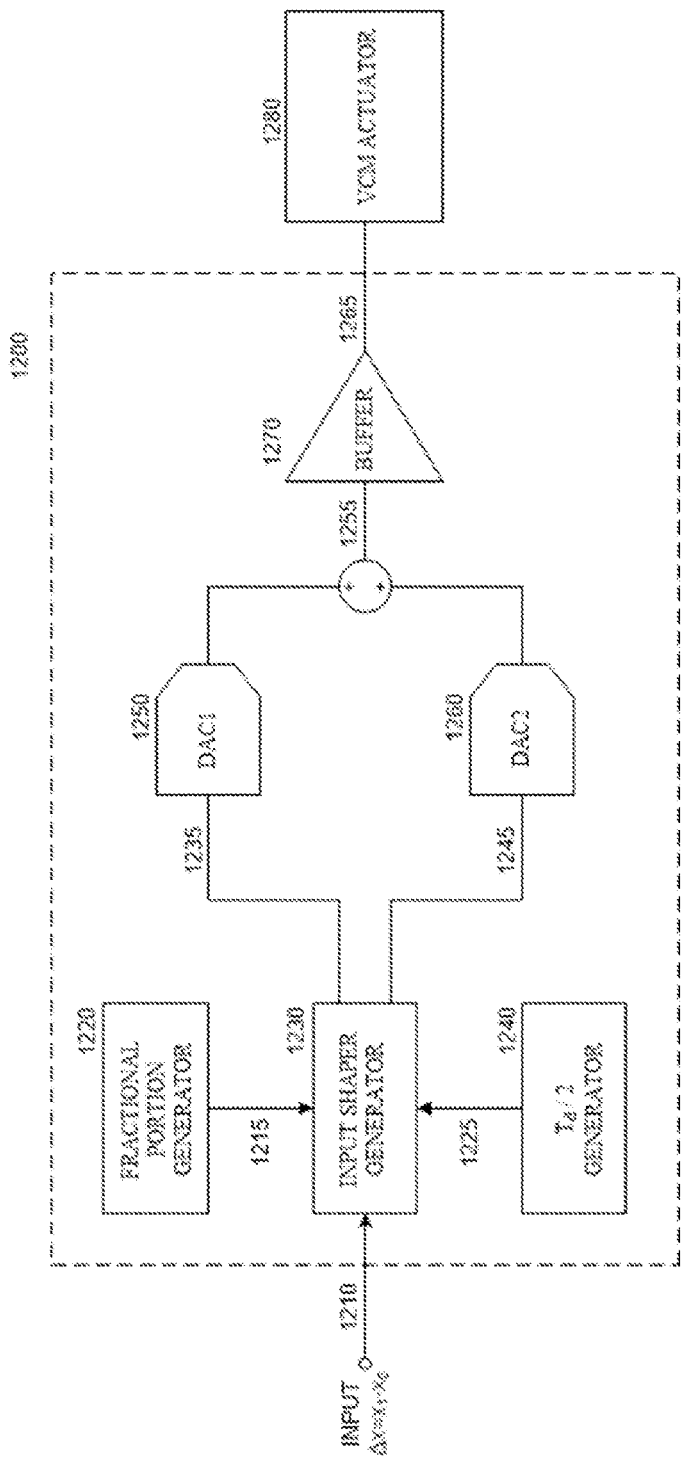
FIG. 12 is a block diagram illustrating a driver of an under damped VCM actuator in accordance with first order approximation of the input shaping method of the present invention.

As it can be seen that the amplitude component in the shaping functions (17) to (19) can be either a constant (a first constant term or "first term") or in forms of a constant term ("first term") plus (or minus) another constant term multiplied by M ("second term"). The first constant term of input shaping signals is the input shaping signals of the zero damped system. The second term is the first order modification of the input shaping signals of the under damped system. For example, in $3^{rd}$ order shaping function (18), the first component is ¼(1+M) which is the first term, ¼ (the input shaping signals of the zero damped system) plus the second term, ¼ times M (the first order modification of the input shaping signals of the under damped system). This component can be readily achieved by a circuit shown in FIG. 12, which is a specific implementation of the embodiment shown in FIG. 4. As shown in FIG. 12, the driver 1200 comprises a first generator 1240 ("$T_d/2$ Generator") which is operable to read a first manufacture data from ISP and to generate a half natural period, $T_d/2$ of the VCM actuator, by selecting a value approximate to the first data in a first table of the driver. The driver also comprises a second generator 1220 "Fractional Portion Generator" which is operable to read a second manufacture data from the ISP and to generate the M=1−K value, by selecting a value approximate to the second data in a second table of the driver. An input shaping signal generator 1230 of the diver is configured to be operable to read an input signal 1210 corresponding to a desired camera lens moving distance from the ISP and to generate a shaping signal of corresponding zero damped system at node 1235 according to the value of the half natural period received at node 1225 and a first order modification signal due to system damping ratio at the node 1245 according to the value of the half natural period received at the node 1225 and the M value received at the node 1215. The driver further comprise digital to analog converters 1250 (DAC1) and 1260 (DAC2), wherein DAC1 receives the digital shaping signal at node 1235 and converts the signal to an analog signal, DAC2 receives the first order modification signal at node 1245 and converts the signal to an analog signal. The two analog signals from DAC1 and DAC2 are combined (the first term plus or minus the $2^{nd}$ term in a component of the shaping function) at node 1255 and send to a buffer amplifier 1270. The buffer amplifier converts the analog shaping signal to a proper current required for the voice coil actuator to drive the camera lens to the desired distance. In circuit implementation the two DACs (DAC1 and DAC2) can be merged to one DAC. This type of circuits can be readily integrated within the driver 400 in FIG. 4 for the circuit implementation. The simplified input shaping signals can greatly reduce the complexity of the circuit design, computation and internal look up table. Thus reduce the IC complexity and cost.

Figure 13:
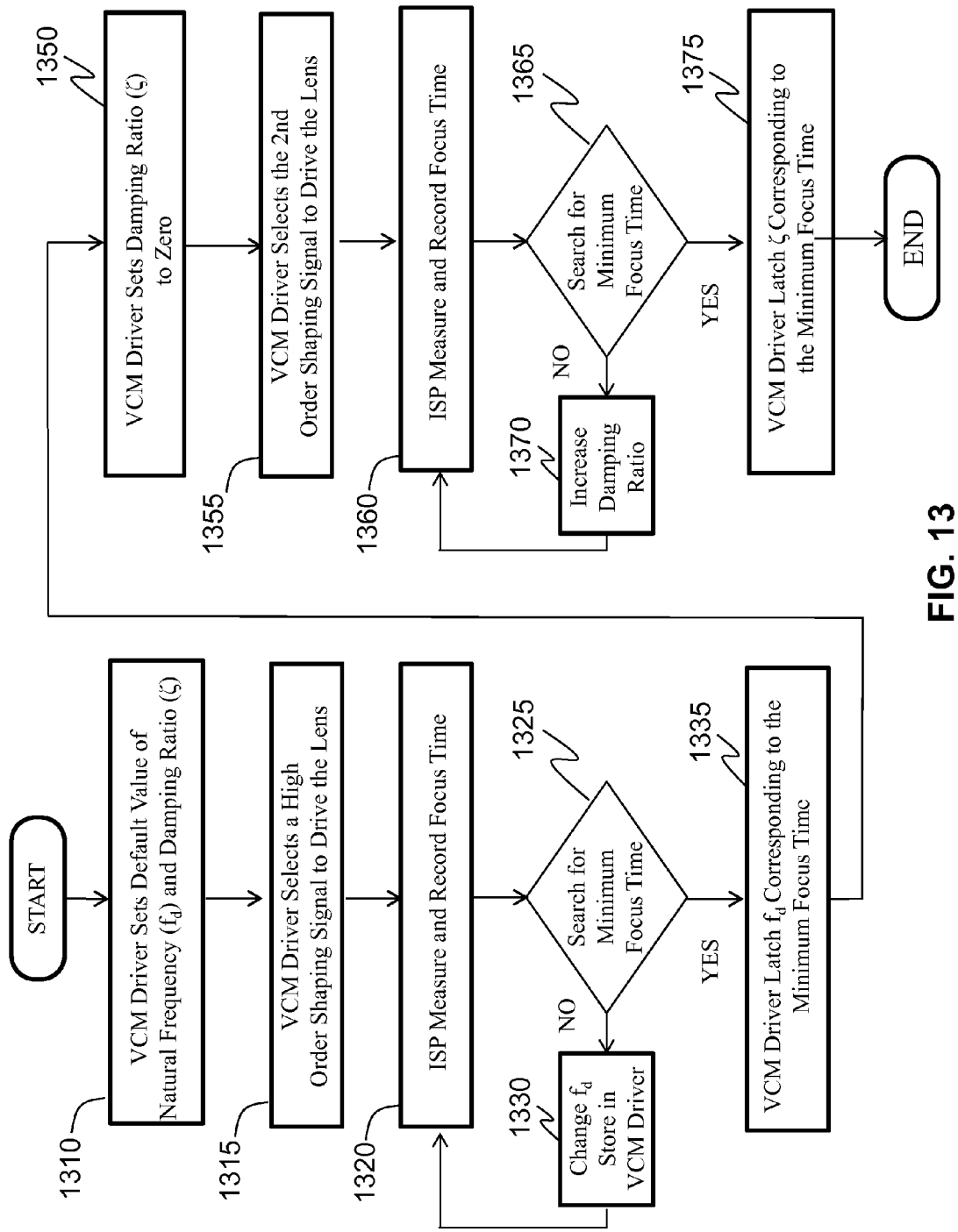
FIG. 13 is a flowchart illustrating automatic search of the camera or camera module system's natural frequency and damping ratio in accordance with one embodiment of the present invention.

In another embodiment of the present invention, the VCM driver can automatically search and lock the system natural frequency and damping ratio. FIG. 13 is a flowchart illustrating automatic searching the camera or camera module system's natural frequency. Initially the VCM driver sets a default value of the natural frequency (step 1310), for example setting $f_d$=110 Hz. Since the higher order input shaping signal system is not sensitive to the damping ratio, the driver selects a high order such as fourth order input shaper and sets a default damping ratio (for example setting $\zeta$=0.02) (step 1315). Then, the ISP measures and records the focus time using the default setting. (Step 1320) Next, ISP performs general searching algorithm, such as binary search, to determine if the minimum focus time is reached (step 1325). If it is not the minimum focus time, the ISP changes the natural frequency setting in the driver through $I^2C$ port (step 1330) and repeat step 1320 until the minimum focus time is found. The corresponding natural frequency is or closes to the actual system natural frequency. The driver will latch this natural frequency (or write into none volatile memory) in the driver IC and use it as the natural frequency in the input shaping signal generation. (1335).

Still referring to FIG. 13, similar to nature frequency searching, the system damping ratio can be searched automatically. Since the second order input shaper results in a faster lens settling speed compared with that of the fourth order but it is sensitive to the damping ratio, after the completion of the natural cycle time searching, ISP sets the driver IC to second order input shaper and starts with $\zeta$ =0 (step 1350 and 1355). The ISP measures and records the focus time of the system using these initial values (1360), then increases the damping ratio value (1370), measures and records the new focus time (1360); in this way the minimum focus time can be found. The ISP will store the damping ratio value to the driver (1375), and the driver will use this damping ratio value as the system damping ratio to generate the input shaping signal. The system completed the natural frequency and damping ratio automatic searching process, the modeled natural frequency and damping ratio are stored in the driver IC. These values are close to the actual natural frequency and damping ratio. They are used by the driver to generate the input shaping signals.

The foregoing examples illustrate certain exemplary embodiments from which other embodiments, alternatives, variations, and modifications will be apparent to those skilled in the art. Accordingly, the invention is intended to embrace all other such alternatives, modifications, and variations that fall within the spirit and scope of the appended claims.

What is claimed is:

1. A device for driving an under damped voice coil motor (VCM) actuator of a camera lens, comprising:
   a first generator operable to read a first manufacture data from an image signal processor (ISP) and to generate a half natural period, ½$T_d$, of the VCM actuator by selecting a value approximate to the first data in a first table of the device, a second generator operable to read a second manufacture data from the ISP and to generate the maximum overshoot, K, of the VCM actuator by selecting a value approximate to the second data in a second table of the device, an input shaping signal generator operable to read an input signal corresponding to a desired camera lens moving distance from the ISP and to generate a shaping signal according to the value of the half natural period and the maximum overshoot value;

wherein the shaping signal is a function selected from the group consisting of

1) $\begin{bmatrix} A_i \\ t_i \end{bmatrix} = \begin{bmatrix} \frac{1}{(1+K)} & \frac{K}{(1+K)} \\ 0 & \frac{T_d}{2} \end{bmatrix}$ 2) $\begin{bmatrix} A_i \\ t_i \end{bmatrix} = \begin{bmatrix} \frac{1}{(1+K)^2} & \frac{2K}{(1+K)^2} & \frac{K^2}{(1+K)^2} \\ 0 & \frac{T_d}{2} & T_d \end{bmatrix}$, and 3) $\begin{bmatrix} A_i \\ t_i \end{bmatrix} = \begin{bmatrix} \frac{1}{(1+K)^3} & \frac{3K}{(1+K)^3} & \frac{3K^2}{(1+K)^3} & \frac{K^3}{(1+K)^3} \\ 0 & \frac{T_d}{2} & T_d & \frac{3T_d}{2} \end{bmatrix}$ wherein $A_i$ is the amplitude component and $t_i$ is the time component of the shaping function, $T_d$ is the natural period and $K \neq 1$;

the driving device further comprising a digital to analog converter and a buffer amplifier, wherein the digital to analog converter and buffer amplifier convert the shaping signal to the current required for a VCM actuator to drive the camera lens to a desired distance.

2. The device of claim 1, wherein the shaping signal is $\begin{bmatrix} A_i \\ t_i \end{bmatrix} = \begin{bmatrix} \frac{1}{(1+K)^{N-1}} & \cdots & a_i\frac{K^{i-1}}{(1+K)^{N-1}} & \cdots & \frac{K^{N-1}}{(1+K)^{N-1}} \\ 0 & \cdots & (i-1)\frac{T_d}{2} & \cdots & (N-1)\frac{T_d}{2} \end{bmatrix}$ wherein N is an integer, $A_i$ is the amplitude component and $t_i$ is the time component of the shaping function, $a_i$ is a coefficient and can be found from the $i^{th}$ row of Pascal's triangle, and $K \neq 1$;

3. The device of claim 1, wherein said first and second tables are look up tables stored in a memory array in the driving device.

4. The device of claim 1, wherein said first and second tables are constructed by logic circuits integrated in the driving device.

5. A device for driving an under damped voice coil motor (VCM) actuator of a camera lens, comprising:

a first generator operable to read a first manufacture data from an image signal processor (ISP) and to generate a half natural period, ½$T_d$, of the VCM actuator by selecting a value approximate to the first data in a first table of the device, a second generator operable to read a second manufacture data from the ISP and to generate M value, of the VCM actuator by selecting a value approximate to the second data in a second table of the device, an input shaping signal generator operable to read an input signal corresponding to a desired camera lens moving distance from the ISP and to generate a first and second term of a component of a shaping signal according to the value of the half natural period and the M value;

wherein the shaping signal is a function selected from the group consisting of

1) $\begin{bmatrix} A_i \\ t_i \end{bmatrix} = \begin{bmatrix} 0.5 + \frac{M}{4} & 0.5 - \frac{M}{4} \\ 0 & \frac{T_d}{2} \end{bmatrix}$ 2) $\begin{bmatrix} A_i \\ t_i \end{bmatrix} = \begin{bmatrix} \frac{1}{4}(1+M) & \frac{1}{2} & \frac{1}{4}(1-M) \\ 0 & \frac{T_d}{2} & T_d \end{bmatrix}$, and 3) $\begin{bmatrix} A_i \\ t_i \end{bmatrix} = \begin{bmatrix} \frac{1}{8}\left(1+\frac{3M}{2}\right) & \frac{3}{8}\left(1+\frac{M}{2}\right) & \frac{3}{8}\left(1-\frac{M}{2}\right) & \frac{1}{8}\left(1-\frac{3M}{2}\right) \\ 0 & \frac{T_d}{2} & T_d & \frac{3T_d}{2} \end{bmatrix}$ wherein $A_i$ is the amplitude component and $t_i$ is the time component of the shaping function and M=1−K and K≠1;

the driving device further comprising at least one digital to analog converter and a buffer amplifier, wherein the digital to analog converter converts first and second term of each component of the shaping function to analog signals, the analog signals are combined and sent to the buffer amplifier which converts the shaping signals to the current required for a VCM actuator to drive the camera lens to a desired distance.

6. The device of claim 5, wherein said first and second tables are a look up tables stored in a memory array in the driving device.

7. The device of claim 5, wherein said first and second tables are constructed by logic circuits integrated in the driving device.

8. A method for driving an under damped voice coil motor (VCM) actuator of a camera lens, comprising:

reading a first manufacture data from an image signal processor (ISP) by a first generator which generates a half natural period, ½$T_d$, of the VCM actuator by selecting a value approximate to the first data in a first table of the device;

reading a second manufacture data from the ISP by a second generator which generates the maximum overshoot, K, of the VCM actuator by selecting a value approximate to the second data in a second table of the device;

reading an input signal corresponding to a desired camera lens moving distance from the ISP by an input shaping signal generator which generates a shaping signal according to the value of the half natural period and the maximum overshoot value;

wherein the shaping signal is a function selected from the group consisting of

1) $\begin{bmatrix} A_i \\ t_i \end{bmatrix} = \begin{bmatrix} \frac{1}{(1+K)} & \frac{K}{(1+K)} \\ 0 & \frac{T_d}{2} \end{bmatrix}$ 2) $\begin{bmatrix} A_i \\ t_i \end{bmatrix} = \begin{bmatrix} \frac{1}{1+K^2} & \frac{2K}{1+K^2} & \frac{K^2}{1+K^2} \\ 0 & \frac{T_d}{2} & T_d \end{bmatrix}$, and 3) $\begin{bmatrix} A_i \\ t_i \end{bmatrix} = \begin{bmatrix} \frac{1}{(1+K)^3} & \frac{3K}{(1+K)^3} & \frac{3K^2}{(1+K)^3} & \frac{K^3}{(1+K)^3} \\ 0 & \frac{T_d}{2} & T_d & \frac{3T_d}{2} \end{bmatrix}$ wherein $A_i$ is the amplitude component and $t_i$ is the time component of the shaping function, $T_d$ is the natural period and $K \neq 1$; and converting the shaping signal by an analog converter and a buffer register to the current required for the VCM actuator to drive the camera lens to a desired position.

9. A method for driving an under damped voice coil motor (VCM) actuator of a camera lens, comprising:

reading a first manufacture data from an image signal processor (ISP) by a first generator which generates a half natural period, ½ $T_d$, of the VCM actuator by selecting a value approximate to the first data in a first table of the device;

reading a second manufacture data from the ISP by a second generator which generates the maximum overshoot, K, of the VCM actuator by selecting a value approximate to the second data in a second table of the device;

reading an input signal corresponding to a desired camera lens moving distance from the ISP by an input shaping signal generator which generates a shaping signal according to the value of the half natural period and the maximum overshoot value;

wherein the shaping signal is a function selected from the group consisting of

1) $\begin{bmatrix} A_i \\ t_i \end{bmatrix} = \begin{bmatrix} 0.5 + \frac{M}{4} & 0.5 - \frac{M}{4} \\ 0 & \frac{T_d}{2} \end{bmatrix}$ 2) $\begin{bmatrix} A_i \\ t_i \end{bmatrix} = \begin{bmatrix} \frac{1}{4}(1+M) & \frac{1}{2} & \frac{1}{4}(1-M) \\ 0 & \frac{T_d}{2} & T_d \end{bmatrix}$, and 3) $\begin{bmatrix} A_i \\ t_i \end{bmatrix} = \begin{bmatrix} \frac{1}{8}\left(1+\frac{3M}{2}\right) & \frac{3}{8}\left(1+\frac{M}{2}\right) & \frac{3}{8}\left(1-\frac{M}{2}\right) & \frac{1}{8}\left(1-\frac{3M}{2}\right) \\ 0 & \frac{T_d}{2} & T_d & \frac{3T_d}{2} \end{bmatrix}$ wherein $A_i$ is the amplitude component and $t_i$ is the time component of the shaping function and $M = 1 - K$ and $K \neq 1$; and converting the shaping signal by at least on digital to analog converter and a buffer register to the current required for the VCM actuator to drive the camera lens to a desired position.

10. A method for driving an under damped voice coil motor (VCM) actuator of a camera lens, comprising:

setting default values for a natural frequency and damping ratio in a driver for a VCM actuator;

selecting a shaping signal having an order higher than two to drive the VCM actuator;

image signal processor (ISP) measuring and recording the focus time;

ISP searching and determining if the minimum focus time is reached; if not, changing the natural frequency setting in the driver and go to the previous step; the driver latching the natural frequency corresponding to the minimum focus time; setting the damping ratio to zero in the driver;

selecting the second order shaping signal to drive the VCM actuator;

ISP measuring and recording the focus time;

ISP searching and determining if the minimum focus time is reached; if not, increasing the damping ratio in the driver and go to the previous step;

the driver latching the damping ratio corresponding to the minimum focus time;

using the latched nature frequency and damping ratio which are close to the actual properties of the VCM actuator to drive the camera lens.

* * * * *